July 31, 1923.
R. B. HANSCOM
LUBRICATING DEVICE FOR AUTOMOBILES, ETC
Filed Oct. 15, 1921
1,463,421
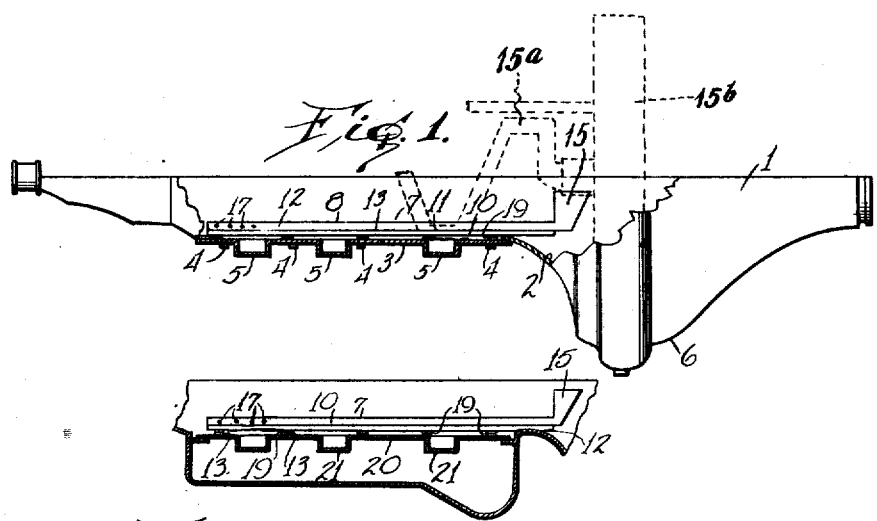
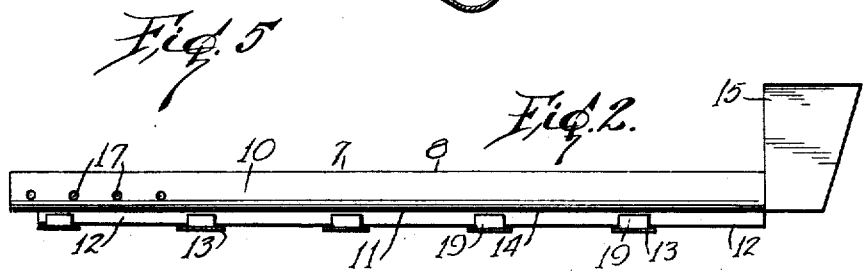
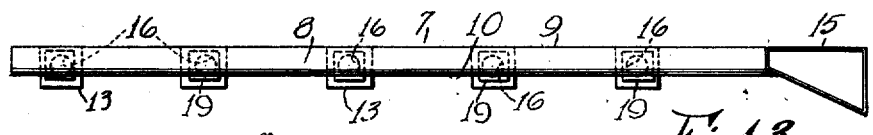
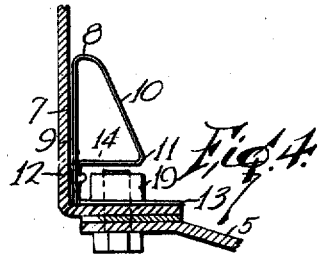
INVENTOR
R. B. Hanscom
BY
ATTORNEYS Patented July 31, 1923.

1,463,421

UNITED STATES PATENT OFFICE.

RALPH B. HANSCOM, OF MORRISTOWN, SOUTH DAKOTA.

LUBRICATING DEVICE FOR AUTOMOBILES, ETC.

Application filed October 15, 1921. Serial No. 507,996.

*To all whom it may concern:*

Be it known that I, RALPH B. HANSCOM, a citizen of the United States, and a resident of Morristown, in the county of Corson and State of South Dakota, have invented a new and useful Improvement in Lubricating Devices for Automobiles, Etc., of which the following is a full, clear, and exact description.

My invention relates generally to devices for lubricating moving parts of an internal combustion engine by the so-called "splash system" and more particularly to means for conducting a lubricating liquid from a reservoir to the splash receptacles. My invention consists in the combinations, constructions and arrangements herein described and claimed:

The chief object of my invention is to provide a conduit which is adapted to be installed in the crank case of an automobile for conducting a lubricating liquid to the lubricant receptacles in the crank case, and which is designed to obviate the objectionable features of the oil conducting tubes ordinarily employed in a like service.

I am aware that oil conducting tubes formed at one end to receive oil from a moving part and to discharge the oil within the crank case of an internal combustion engine, with which an automobile is equipped, are in common use. Such tubes have been found unsatisfactory in service in that they become clogged readily on account of the presence of foreign matter in the lubricating liquid or on account of foreign matter entering the open inlet end of the tube, this being due to the fact that the cross sectional area of the tubes now in use is relatively small and that such tubes include curved portions adjacent to their open inlet ends. Moreover, the tubes now in use, of which I am aware, must be positioned in the upper part of the crank case and in consequence are frequently damaged by the contact therewith of moving parts of the engine. When the oil tubes now in use are clogged or damaged in any other way, the flow of the lubricant to the receptacles in the crank case is stopped and serious injury to the moving parts of the engine results. The flow of a lubricant to the receptacles in the crank case may be prevented by the tilting of the engine, as when an automobile is ascending an incline, since the opposite end of the oil tube will then be positioned at a higher level than the inlet end.

Still another disadvantage of the oil tubes now in use is that such oil tubes cannot be replaced or repaired without dismounting the engine from its supporting frame.

It is therefore an object of my invention to provide a conduit for a lubricating liquid that is designed to supply the lubricating liquid to receptacles in the crank case continuously, irrespective of the angle of inclination of the crank case.

A further object of my invention is to provide a device of the character described that is adapted for engagement with the bolts which hold the lower crank case cover of an engine of an ordinary construction in place, whereby the device is positioned in the lower part of the crank case and can be removed when the lower cover of the crank case is removed.

A further object of my invention is to provide a conduit of the character described that has no inwardly projecting portions which would tend to interfere with the flow of a liquid through the conduit.

A still further object of my invention is to provide a device of the character described that is simple in construction and can be manufactured cheaply.

Other objects and advantages will appear in the following specification, and the novel features of the invention will be particularly pointed out in the appended claims.

My invention is illustrated in the accompanying drawings, forming part of this application, in which Fig. 1 is a side elevation of a portion of an engine block equipped with my invention, portions thereof being broken away and other portions being shown in section, Fig. 2 is an enlarged side elevation of my improved lubricant conducting tube, Fig. 3 is a plan view of the same, Fig. 4 is an end view of the tube, showing the position thereof with respect to the walls of the crank case, and Fig. 5 is a longitudinal section of my device, applied to a crank case of different design from that shown in Fig. 1.

Referring now to the drawings, 1 denotes a portion of an engine block which embodies a crank case 2 provided with a lower cover 3. The latter is detachably secured in the position illustrated by means of cap screws 4, which engage portions of the crank case proper. The lower cover 3 of the crank case is fashioned with relatively depressed portions 8 in its wall which constitute receptacles for a lubricant and into which the crank arms and connecting rods of the engine dip. The crank case 2 is in communication at one end with a reservoir 6 for the lubricant which is supplied to the receptacles 5, as will be hereinafter set forth.

The parts described so far are ordinary in construction and form no part of my invention, except in so far as they cooperate with the parts which will now be described.

Instead of the usual tube for conducting a lubricant to the receptacle 5, I provide a conduit which is indicated generally at 7 and which is best seen in Figures 2, 3 and 4. This conduit is formed of a single piece of metal which is bent intermediately at 8 along a longitudinal line to provide sides 9 and 10. The side 10 is bent or otherwise fashioned at 11 along a longitudinal line for practically its entire length so that the end portion thereof, denoted at 12, is contiguous to the side 9. The portion 12 of the side 10 is secured to the side 9 by soldering or brazing so as to provide a liquid tight joint. The portion of the side 9 extending below the edge of the portion 11 is cut so as to provide a plurality of lugs 13. The lugs 13 are then bent at right angles and lie parallel with the portion 14 of the side that forms the bottom of the conduit 7. The sides 9 and 10 are fashioned and bent relatively at one end to provide a receptacle 15 which has the form best seen in Figures 2 and 3 and is in open communication at its lower end with the straight body portion of the conduit 7. It is to be observed at this point that the latter is triangular in cross section, the vertex of the triangle being at the upper end thereof. The receptacle 15 has a greater cross sectional area at its open upper end than at any point along its length, which cross sectional area is greater than that of the straight portion of the conduit 7.

Each lug 13 is provided with an opening 16 therethrough, which openings are for engagement with the bolts 4. The lugs 13 also have nuts 19 secured thereto by solder or the like. The side 9 has formed therein a plurality of openings 17 adjacent to the discharge end of the conduit for a purpose which will be hereinafter set forth. It is to be observed also that the receptacle or cup portion 15 of the device extends at right angles to the longitudinal axis of the conduit 7 and in consequence there are no curved portions in the device which might interfere with the flow of a liquid along the conduit 7. A liquid delivered to the receptacle 15 passes directly therefrom into the straight portion integral with the receptacle.

From the foregoing description of the various parts of the device, the operation thereof may be readily understood. When the device is arranged within the crank case 2 and secured in adjusted position therein by projecting the bolts 4 through the openings 16 before such bolts engage cooperating parts of the crank case proper, the open upper end of the receptacle 15 will be positioned below the level of a crank shaft 15ᵃ shown in dotted lines in Figure 1 and below the rear support for the crank shaft. In this position, a lubricating fluid will be delivered to the receptacle 15 by the fly wheel shown in dotted lines at 15ᵇ of the engine, which is ordinarily partially immersed in a lubricating liquid in the reservoir 6. The lubricating liquid will be supplied also to the receptacle 15 from the rear crank arm and crank shaft rear bearing when the device is arranged in an internal combustion engine of the type of construction illustrated. It will be obvious that the lubricating liquid delivered through the receptacle 15 will be forced along the conduit 7 by the head of the liquid in the receptacle and will be discharged from the open end of the conduit at the front end of the crank case. The lower part of the crank case is inclined in an internal combustion engine of an ordinary construction, so that the lubricating liquid discharged from the conduit 7 will flow into the receptacles 5 and the overflow therefrom will be returned to the reservoir 6. In the event that an automobile equipped with my invention is ascending a hill or that the crank case 2 is inclined at its front end for any other reason, the lubricating liquid delivered to the receptacle 15 will be discharged from the openings 17 until the elevation of the opening 17 remote from the discharge end of the conduit is such that the head of the liquid in the receptacle is no longer sufficiently great to cause a discharge of the lubricating liquid. This elevation could not be reached in service and in consequence the flow of a lubricating liquid from the conduit 7 will be practically continuous.

When it is desired to replace the conduit 7 or to effect any changes therein, the lower cover plate 3 is removed and the device can then be disassembled and detached from the engine.

In Figure 5 I show my device as applied to a crank case of different form from that shown in Figure 1 of the drawings. This form of crank case is essentially the same as the crank case heretofore described. The difference between the two forms is that a plate 20, having depressions 21 therein, is disposed above the lower end of the crank case 2, and takes the place of the cover 3 which has the depressions 5 therein. The operation of this form of the device is the same in every respect as the one heretofore described, and therefore needs no further explanation.

I claim:

1. The combination with an internal combustion engine having a crank shaft and a crank case, of a single metallic member fashioned and bent for part of its length to provide a relatively large straight conduit portion having a flange extending parallel with the longitudinal axis of the straight portion, and fashioned and bent for the remainder of its length to provide an upturned lubricant receiving portion, said flange being removably secured to said crank case at the bottom thereof, whereby said straight portion is arranged to lie in a plane parallel to said crank shaft adjacent the bottom of said crank case.

2. As an article of manufacture, a device consisting of a single metallic member adaptto be disposed adjacent the bottom of a crank case fashioned and bent for part of its length to provide a straight conduit portion having a flange extending parallel with the longitudinal axis of the straight portion and fashioned and bent for the remainder of its length to provide an upturned lubricant receiving portion, said straight portion being formed with side walls diverging from a longitudinal vertex line and with a flat lower wall integral with one side wall and permanently joined to the other side wall.

3. As an artitcle of manufacture, a device consisting of a single metallic member fashioned and bent for part of its length to provide a straight conduit portion having a flange extending parallel with the longitudinal axis of the straight portion and fashioned and bent for the remainder of its length to provide an upturned lubricant receiving portion, said flange being formed with a plurality of spaced apart openings therethrough, whereby said flange is adapted to be secured to the bottom wall of a crank case of an internal combustion engine to support said metallic member adjacent the bottom of said crank case.

4. As an article of manufacture, a device consisting of a single metallic member adapted to be disposed adjacent the bottom of a crank case fashioned and bent for part of its length to provide a straight conduit portion having a flange extending parallel with the longitudinal axis of the straight portion and fashioned and bent for the remainder of its length to provide an upturned lubricant receiving portion, said straight portion being provided with a plurality of openings through its walls arranged in a series extending longitudinally from a point adjacent to the discharge end thereof.

RALPH B. HANSCOM.